United States Patent [19]
Christensen

[11] Patent Number: 5,355,375
[45] Date of Patent: Oct. 11, 1994

[54] HUB CONTROLLER FOR PROVIDING DETERMINISTIC ACCESS TO CSMA LOCAL AREA NETWORK

[75] Inventor: Gary S. Christensen, North Oaks, Minn.

[73] Assignee: Network Systems Corporation, Minneapolis, Minn.

[21] Appl. No.: 33,125

[22] Filed: Mar. 18, 1993

[51] Int. Cl.$^5$ .......................... H04J 3/16; H04Q 9/00
[52] U.S. Cl. .................. 370/85.2; 370/85.3; 370/85.8; 370/95.2; 340/825.08
[58] Field of Search .................. 370/58.1, 58.2, 58.3, 370/85.1, 85.2, 85.3, 85.4, 85.6, 85.7, 85.8, 85.13, 85.14, 94.1, 94.3, 95.1, 95.2, 97; 340/825.02, 825.06, 825.08, 825.5, 825.51, 825.54; 375/3, 7

[56] References Cited

U.S. PATENT DOCUMENTS

| | | | |
|---|---|---|---|
| 4,479,228 | 10/1984 | Crane | 375/7 |
| 4,500,990 | 2/1985 | Akashi | 370/85.3 |
| 4,536,838 | 8/1985 | Ringel et al. | 370/95.2 |
| 4,584,575 | 4/1986 | Ryckeboer | 370/85.2 |
| 4,649,548 | 3/1987 | Crane | 375/7 |
| 4,692,919 | 9/1987 | West, Jr. | 370/85.8 |
| 4,740,956 | 4/1988 | Hailpern et al. | 370/85.2 |
| 4,750,171 | 6/1988 | Kedar et al. | 370/85.3 |
| 4,766,402 | 8/1988 | Crane | 375/36 |
| 4,787,082 | 11/1988 | Delaney et al. | 370/85.8 |
| 4,819,229 | 4/1989 | Pritty et al. | 370/85.6 |
| 4,825,435 | 4/1989 | Amundsen et al. | 370/97 |
| 4,853,950 | 8/1989 | Crane | 379/24 |
| 4,901,348 | 2/1990 | Nichols et al. | 370/85.2 |
| 4,924,461 | 5/1990 | Amemiya et al. | 370/85.8 |
| 5,012,467 | 4/1991 | Crane | 370/85.3 |
| 5,029,164 | 7/1991 | Goldstein et al. | 370/95.1 |
| 5,088,032 | 2/1992 | Bosack | 370/94.1 |
| 5,130,983 | 7/1992 | Heffner, III | 370/85.8 |
| 5,161,192 | 11/1992 | Carter et al. | 340/825.54 |
| 5,175,732 | 12/1992 | Hendel et al. | 370/94.1 |

FOREIGN PATENT DOCUMENTS 0344035  11/1989  European Pat. Off. .......... 370/85.3

OTHER PUBLICATIONS

Kummerle, Karl, Tobagi, Fouad A. and Limb, John O., "Advances in Local Area Networks", Chapter 20, Performance Analysis of Carrier Sense Multiple Access with Collision Detection, The Institute of Electrical Engineers, Inc., New York, pp. 318–339.

Primary Examiner—Alpus H. Hsu
Attorney, Agent, or Firm—Patterson & Keough

[57] ABSTRACT

A method and apparatus for deterministic access to a carrier-sense-multiple-access (CSMA) or carrier-sense-multiple-access with collision detection (CSMA/CD) local area network (LAN) alters the basic indeterminate contention algorithm of the CSMA/CD protocol LAN within a hub controller. The hub controller includes media control logic that can selectively raise a pseudo carrier control signal to each port, thereby inhibiting any CSMA/CD protocol LAN transmissions by that port. In this way, the media control logic allows the hub controller to control which of the multiple ports will be allowed to contend for access to a common internal bus within the hub controller and for how long. A variety of different deterministic contention algorithms can be implemented by the hub controller, such as sequential polling, interrupt allocation, or a combination of deterministic contention algorithms with the normal CSMA/CD indeterminate contention algorithm.

17 Claims, 4 Drawing Sheets

HUB CONTROLLER FOR PROVIDING DETERMINISTIC ACCESS TO CSMA LOCAL AREA NETWORK

TECHNICAL FIELD

The present invention relates generally to local area networks (LANs) for computer processing systems. More particularly, the present invention relates to a method and apparatus for providing deterministic access to a carrier-sense-multiple-access (CSMA) protocol LAN.

BACKGROUND ART

The use of local area networks (LANs) to communicate messages among computers is well known. One of the standard protocols for controlling access to a LAN is the ANSI/IEEE 802.3 carrier-sense-multiple-access with collision detection (CSMA/CD) Standard, commonly known as the EtherNet® standard.

In a CSMA/CD protocol LAN, all of the nodes or stations on the network are connected to a common carrier, such as a coaxial cable. When a node is ready to transmit a message, it monitors the common media to determine whether any other transmissions are occurring. If the node senses that the media is busy (i.e., a carrier signal is present), transmission of the message is deferred until the media is not busy. When the node senses that the media is not busy, transmission of the message is attempted. Due to the fact that multiple nodes that are separated by finite physical distances along the common media may simultaneously attempt to transmit a message, it is possible that overlapping messages can be transmitted, resulting in a collision of different messages. In this case, each node stops transmitting and waits some random period of time before reattempting transmission of the message.

It will be recognized that for any given node on the LAN, a CSMA/CD protocol provides for an indeterminate, random-type of contention algorithm that controls access to the common media. In other words, under a standard CSMA/CD protocol, a node cannot be guaranteed that the media will be available for transmission when that node has a message ready to transmit. For typical computer-to-computer transmissions across a LAN, the indeterminate nature of the CSMA/CD contention algorithm works quite well due to the sporadic or bursty nature of most computer transmissions. Much of the effort in improving CSMA/CD protocol LANs has focused on evaluating and optimizing the effective throughput of the LAN based on an analysis of the probability of obtaining access given the indeterminate nature of the contention algorithm. Tobagi, F. and Hunt, B., "Performance Analysis of Carrier Sense Multiple Access with Collision Detection", *Advances in Local Area Networks*, IEEE Press (1987), Chpt. 20, pp. 318-339.

Although it is possible to optimize the indeterminate nature of the contention algorithm for a CSMA/CD protocol LAN for typical computer transmissions, the CSMA/CD type of indeterminate contention algorithms are, almost by definition, not well suited to implementing the transmission of real time digital video information or other types of digital transmissions that require a known or deterministic access capacity across the LAN. In the case of a terminal running a video simulation application where the data for the simulation is stored on a network server, that terminal may require an effective and sustained data transfer rate across the LAN. In addition, because messages transmitted across a typical CSMA/CD protocol LAN are limited to a predetermined maximum packet length, such as 1500 eight bit bytes for the EtherNet® protocol, the node running the video simulation application will be forced to give up control of the LAN even if it is able to acquire access to the LAN in the first place.

Some of the newer LAN protocols, such as the ATM protocol or the communication protocols described in U.S. Pat. Nos. 4,787,082, 5,130,983 and 5,175,732, can allocate a fixed amount of network capacity to a given node so as to support the transmission of real time digital video information, for example. While many of these new types of LAN protocols can effectively support the type of deterministic access to the LAN that is required, they necessarily require the installation of a completely new network. Due to the tremendous investment in existing LANs, it would be desirable to allow the existing base of LANs to provide for deterministic access to the network.

Unfortunately, all of the current solutions to this problem for existing CSMA/CD protocol LANs have relied on changing the hardware and/or the software on all of the nodes in the CSMA/CD protocol LAN in order to allow for deterministic access to the LAN, as shown for example in U.S. Pat. Nos. 4,750,171 and 4,819,229. The addition of this type of hardware and/or software to every single node in the LAN is also a costly solution when only one or two nodes on the LAN may actually utilize real time digital video displays that require a deterministic data transfer rate across the LAN.

Accordingly, it would be desirable to solve the problem of providing a deterministic allocation of capacity for existing CSMA/CD protocol LANs, without requiring that additional software and/or hardware be added to user nodes in the network. In addition, it would be desirable to provide a deterministic access contention algorithm for a CSMA/CD protocol LAN that has the flexibility to utilize the standard indeterminate contention algorithm for a CSMA/CD protocol for those user nodes that do not require deterministic access to the network.

SUMMARY OF THE INVENTION

The present invention is a method and apparatus that provides for deterministic access to a carrier-sense-multiple-access (CSMA) or carrier-sense-multiple-access with collision detection (CSMA/CD) local area network (LAN) by altering the basic indeterminate contention algorithm of the CSMA/CD protocol LAN within a typical hub controller. In a typical hub controller, multiple ports, each having a transmitter and receiver, are connected to a common internal bus in a star network topology for transferring normal LAN messages within the hub controller. Hub controllers are commonly used in LANs to change media types (e.g. twisted pair to Coaxial cable) and to reamplify and reshape the LAN transmissions, particularly in larger LAN installations. In the present invention, the hub controller additionally includes media control logic that can selectively generate a pseudo carrier control signal to each port, thereby inhibiting any CSMA/CD protocol LAN transmissions by that port. The media control logic allows the hub controller to determine which of the multiple ports will be allowed to contend for access to the common internal bus and for how long. A variety of different deterministic contention algorithms can be implemented by the media control logic of the hub controller, such as sequential polling, interrupt allocation, or a combination of deterministic contention algorithms with the normal CSMA/CD indeterminate contention algorithm.

In the preferred embodiment, each port of the hub controller includes a transmit circuit and a receive circuit. The receive circuit is configured as a normal receiver connecting the port to a common bus within the hub controller. The transmit circuit is connected to the common bus via the media control logic. In the preferred embodiment, the media control logic is implemented using an OR gate having one input connected to the carrier signal on the common bus and the other input connected to a pseudo carrier control signal supplied by a microprocessor. The microprocessor executes a software program implementing a desired deterministic contention algorithm. Some of the versions of the deterministic contention algorithms that can be implemented by the present invention include a polling algorithm where the pseudo carrier control signal is selectively dropped to each node, in turn or in a sequence so as to implement a desired allocation of network capacity, to allow that node to transmit any messages it may have ready for transmission; an interrupt algorithm whereby the pseudo carrier control signal is selectively dropped to any nodes that need a deterministic allocation of the total network capacity for a predetermined amount of time and during the remaining time the pseudo carrier control signal is dropped to all nodes, thereby allowing the normal CSMA/CD contention algorithm to control access to the network during that time period; or any combination of these algorithms.

The advantages of being able to selectively provide a deterministic access capability to an otherwise indeterminate CSMA/CD protocol LAN without requiring modifications to the software or hardware of the user nodes are many. For example, the polling version of the deterministic contention algorithm of the present invention effectively replicates a quasi time-slot polling process whereby each polled node is given a predefined time slot in which to transmit messages, in this case, the maximum packet length as defined by the CSMA/CD protocol. If there are no messages to be transmitted for that node, then the time slot is not used and the controller polls the next node. In this way, the contention algorithm does not waste network capacity in the manner in which a traditional time division multiplex scheme would in allocating network capacity.

Accordingly, it is a primary objective of the present invention to solve the problem of providing a deterministic allocation capacity for existing CSMA/CD protocol LANs, without requiring that additional software and/or hardware be added to user nodes in the network.

Another objective of the present invention is to provide a deterministic access contention algorithm for a CSMA/CD protocol LAN that has the flexibility to utilize the standard indeterminate contention algorithm for a CSMA/CD protocol for those user nodes that do not require deterministic access to the network.

A still further objective of the present invention is to provide a hub controller for a CSMA/CD protocol LAN that can allocate a fixed capacity of the network transmission to one or more nodes in order to support real time data transmission across the LAN, such as for digital video transmissions.

These and other objectives of the present invention will become apparent with reference to the drawings, the detailed description of the preferred embodiment and the appended claims.

DETAILED DESCRIPTION OF THE PREFERRED EMBODIMENT

Figure 1A:
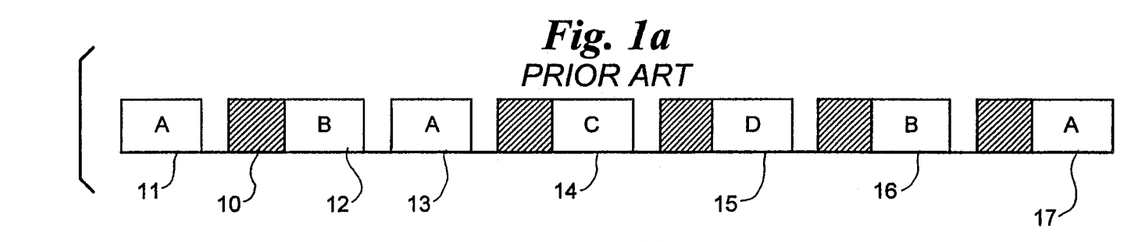
FIG. 1a is a timing diagram of LAN access using the prior art CSMA indeterminate contention algorithm.
Figure 1B:
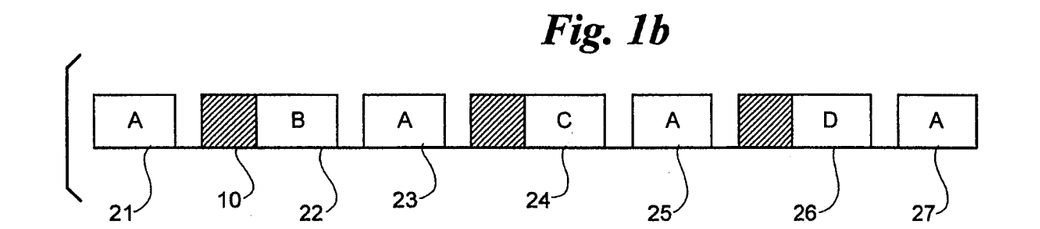
FIG. 1b is a timing diagram of LAN access using the deterministic contention algorithm as implemented by the present invention.

Referring now to FIGS. 1a and 1b, the difference between the prior art indeterminate contention algorithm and the deterministic contention algorithm of the present invention will be shown as a function of the effective allocation of the LAN bandwidth among four user nodes (A, B, C, and D). In the timing example of LAN transmissions shown in FIGS. 1a and 1b, user node A desires to transmit a real time digital video transmission over the LAN that will occupy one-half of the LAN bandwidth for the duration of the digital video transmission. Two of the remaining user nodes (B and C) have bursty-type of data transmissions that each would also occupy one-half of the LAN bandwidth during the time period shown in FIGS. 1a and 1b. The final user node (D) had one data transmission that is ready to transmit as of the midpoint of the time period shown.

The prior art LAN shown in FIG. 1a is a slotted persistent CSMA/CD protocol LAN. For the first two transmissions of user node A, shown at 11 and 13, user node A has obtained the necessary one-half of the LAN bandwidth because user nodes B and C contended for the second transmission time at contention time 10, with user node B prevailing at transmission time 12 and user node C backing off to retransmit at a later transmission time 14. At transmission time 15, it will be seen that user node A has not obtained the necessary transmission time because user node D obtained access to the network. Even though user node A may be allowed to immediately recontend for the network by altering the backoff mechanism within the standard persistent CSMA/CD indeterminate contention algorithm, user node A still contends with and loses to user node B at transmission time 16. Consequently, user A does not end up acquiring control of the network until transmission time 17. The net result is that user node A was only able to transmit three of the four packets of information which would have been necessary if user node A was to meet its real time transmission bandwidth requirements.

In contrast, the deterministic contention algorithm as implemented by the hub controller of the present invention can guarantee that user node A will have the opportunity to transmit all four of the required packets of information during the time period shown in FIG. 1b. During the time periods 21, 23, 25 and 27, for example, the hub controller of the present invention as described hereinafter selectively generates a pseudo carrier control signal to all user nodes B, C and D, except user node A. Hence, user node A is the only node contending for the network during those time periods and will be guaranteed access to the network if it has a message to transmit. During the remaining time periods 22, 24 and 26 in the embodiment shown in FIG. 1b, the other user nodes, B, C and D, contend for the network using the normal CSMA/CD persistent indeterminate contention algorithm. It will be seen that for the type of high contention example shown in FIGS. 1a and 1b, in addition to providing the required deterministic allocation of the network bandwidth to user node A, the present invention also increases the total transmission time available on the network by removing the contention periods 10 that would have otherwise been associated with user node A contending for the network.

Figure 2:
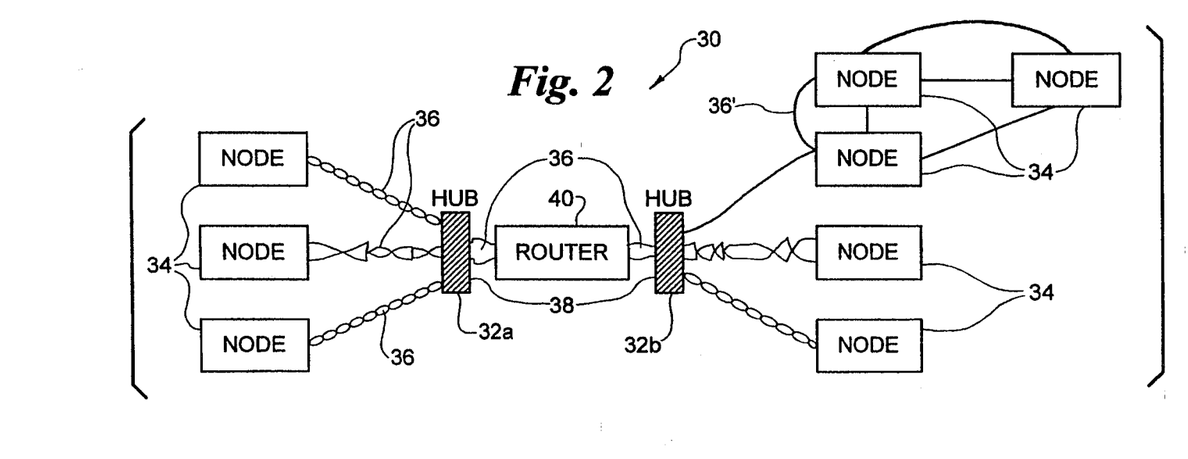
FIG. 2 is a block diagram of a LAN including a hub controller capable of implementing the present invention.

Referring now to FIG. 2, a CSMA/CD protocol LAN network 30 having a hub controller 32 that can implement the present invention will be described. A plurality of user nodes 34 are connected by a connection path 36 to individual ports 38 on a pair of hub controllers 32a and 32b. In the embodiment shown in FIG. 2, the hub controllers 32a and 32b are in turn connected through one of their ports 38 via another connection path 36 to an inter-hub gateway or router 40. The hub controllers 32 are typical hub controllers that implement a bus-based CSMA or CSMA/CD network protocol, such as the ANSI/IEEE 802.3 CSMA/CD Standard, using a star connection topology with all of the user nodes 34 associated with a hub controller 32 being centrally connected to the hub controller 32. Although a pair of hub controllers 32a and 32b are shown, it will be understood that the present invention can be implemented as part of any CSMA or CSMA/CD LAN network 30 having one, two or more typical hub controllers 32. For a more detailed explanation of an example of a typical hub controller in the prior art, reference is made to U.S Pat. No. 4,825,435.

As shown in FIG. 2, the connection paths 36 between the user nodes 34 and the hub controller 32 and between the hub controllers 32 and the router 40, are twisted wire pair, such as the standard telephone wiring and jacks installed in a typical office site. Alternatively, a coaxial cable 36' could be used to connect one or more user nodes 34 to a port 38 in a daisy-chain manner, for example, with all of the nodes 34 sharing the same port connection. Similarly, multiple hub controllers 32 may be connected to one or more gateways 40 by coaxial cable, fibre optic, backplane interface, or wireless interface, in the manner which is well known in the prior art.

Figure 3:
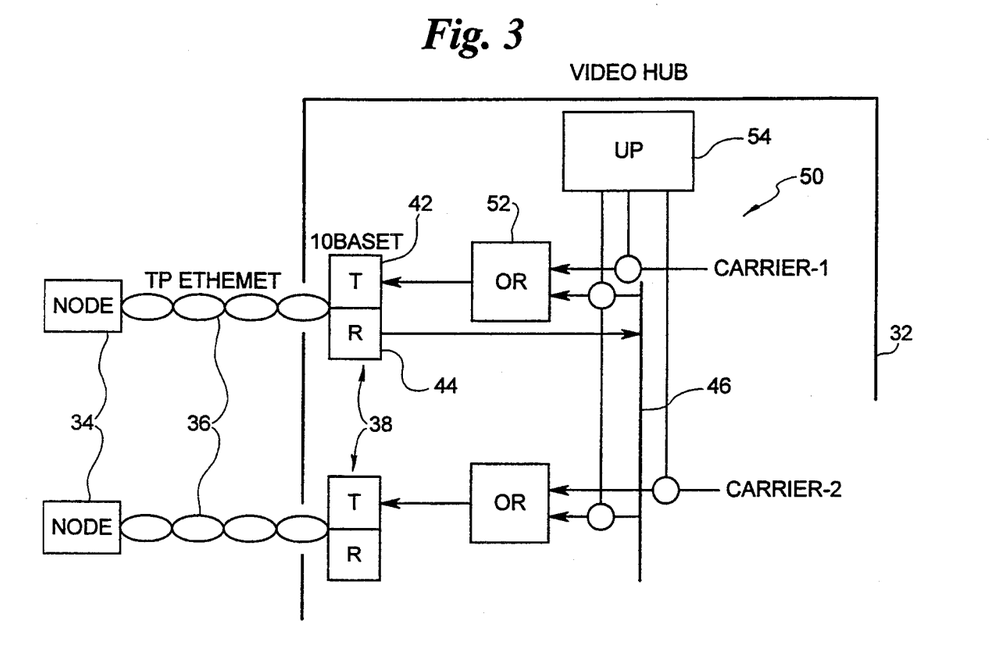
FIG. 3 is a detailed block diagram of a hub controller including the media control logic of the present invention.

Referring now to FIG. 3, a detailed description of the hub controller 32 of the preferred embodiment will be presented. The port 38 of the hub controller 32 includes a transmit circuit 42 and a receive circuit 44. The receive circuit 44 is configured as a normal receiver connecting the connection path 36 to a common bus 46 within the hub controller 32. The transmit circuit 42 is connected to the common bus 46 via a media control logic 50. In this embodiment, the media control logic 50 includes an OR gate 52 having one input connected to the carrier signal on the common bus 46 and the other input connected to a pseudo carrier control signal supplied by a microprocessor 54. The microprocessor 54 executes a software program implementing the desired deterministic contention algorithm as described below. When one or more of the ports 38 are to be inhibited from transmitting in accordance with the deterministic contention algorithm, the microprocessor 54 generates the pseudo carrier control signal (e.g., Carrier-1 and Carrier-2) to each of those ports 38. Although the media control logic 50 is described in terms of an OR gate 52 and a microprocessor 54, it will be apparent to those skilled in the art that numerous other control circuits could be used to accomplish the control of the pseudo carrier control signal to the ports 38.

Figure 4:
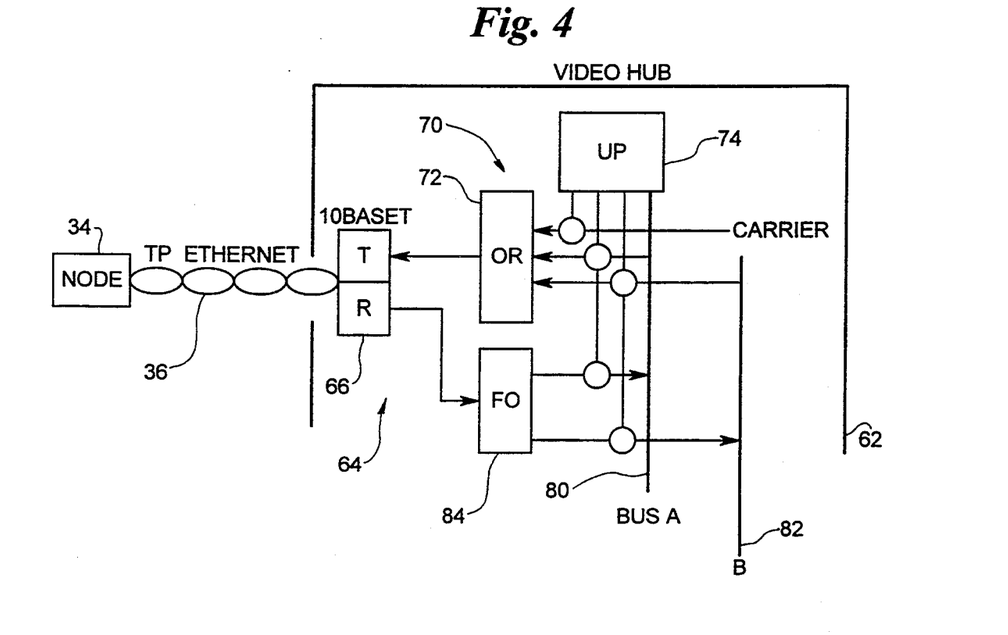
FIG. 4 is a detailed block diagram of an alternative multiple bus version of a hub controller including the media control logic of the present invention.

Referring now to FIG. 4, an alternative embodiment of the hub controller of the present invention will be described. In this embodiment, the hub controller 62 includes a plurality of ports 64 having receiver circuits 66 and transmitter circuits 68, and media control logic 70 having an OR gate 72 and a microprocessor 74. Instead of the single internal bus 46 as shown in the embodiment of FIG. 3, the hub controller 62 of FIG. 4 has two or more separate internal busses 80, 82 and bus selection logic 84 that is coupled between the receiver circuits 66 and each of the busses 80, 82. The bus selection logic 84 is also coupled to the microprocessor 74. In this embodiment, bus 80 (A) is the primary CSMA/CD bus for the hub controller 62 and bus 82 (B) provides a virtual circuit type bus connection that can be requested by any of the ports 64. A node 34 wishing to access bus 82 (B) requests access to bus B by sending a predetermined control signal on bus 80 (A) that is monitored by the microprocessor 74. In response, the microprocessor 74 directs the bus selection logic 84 to multiplex the received signals from the port 64 to bus 82 (B), rather than bus 80 (A). It will be seen that bus 82 (B) may be allocated to only one requesting node 34 at a time as a true virtual circuit, or may be controlled in the manner in which the bus 46 described in FIG. 3 is controlled. It will also be seen that bus 80 (A) may be controlled in the manner in which the bus 46 described in FIG. 3 is controlled, thus providing for two separate internal busses within the hub controller 62 that would be capable of providing deterministic access.

Figure 5A:
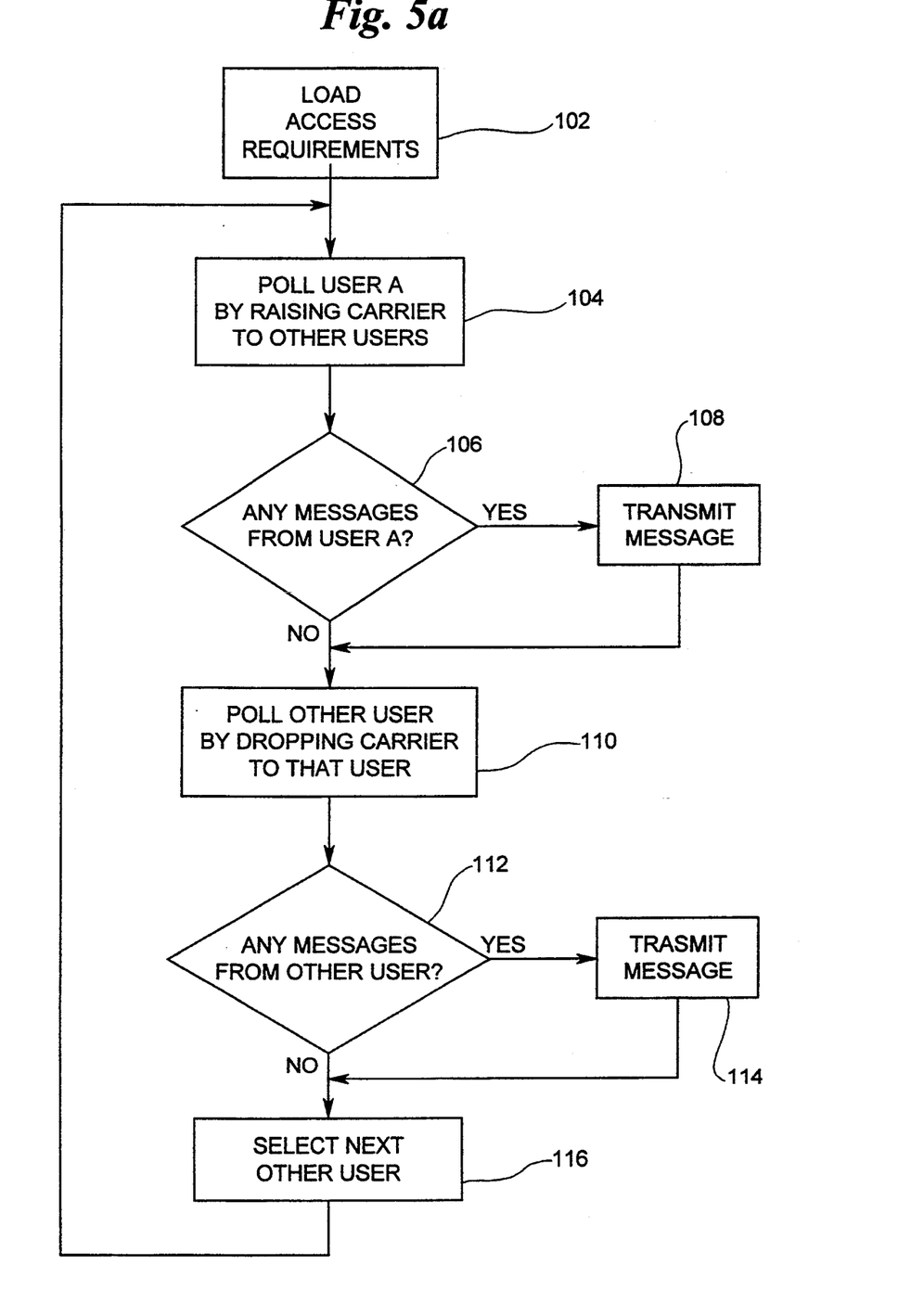
FIGS. 5a and 5b are flow charts of various embodiments of the deterministic contention algorithm of the present invention.
Figure 5B:
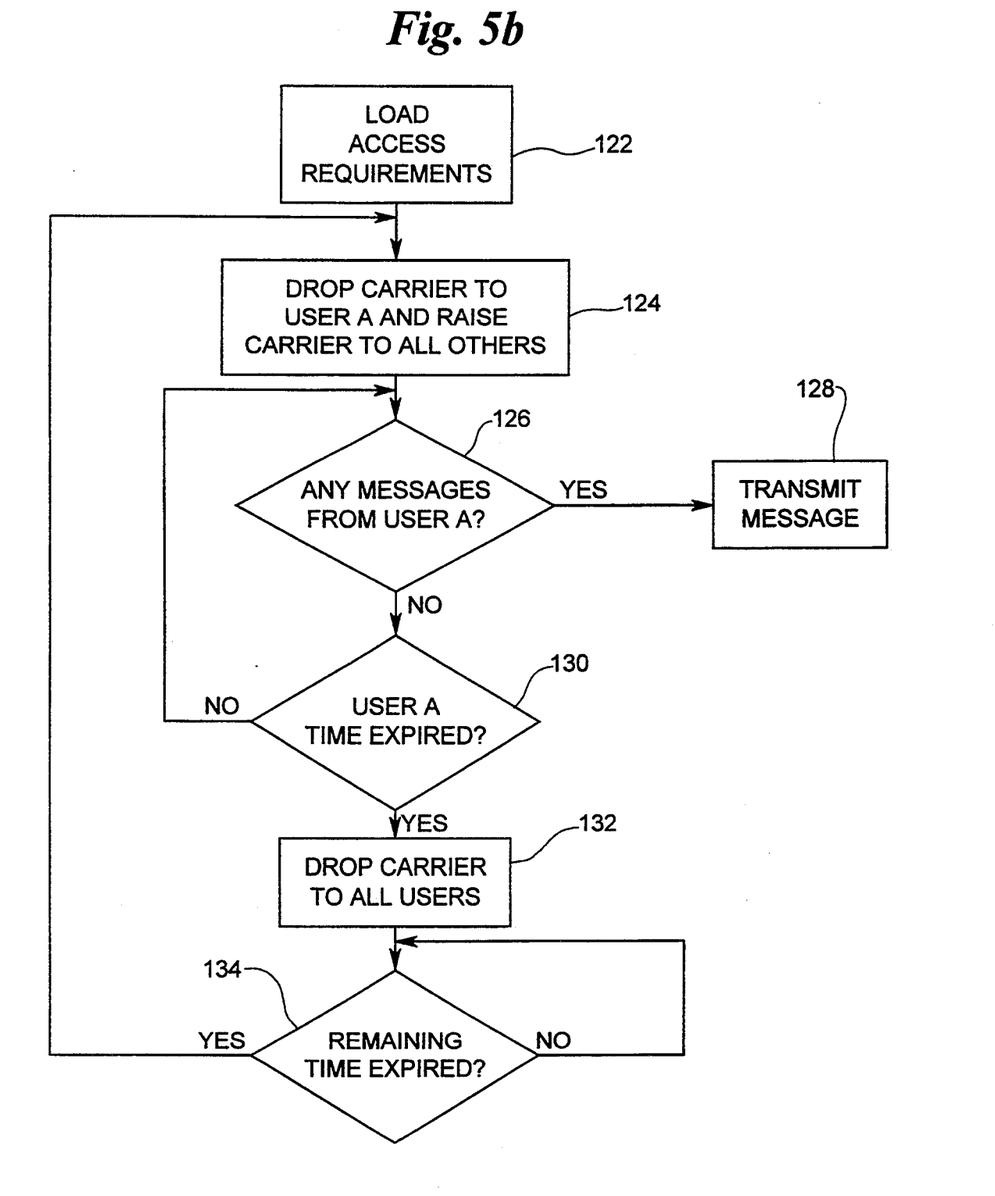

Referring now to FIGS. 5a and 5b, flowcharts of two different embodiments of the deterministic contention algorithm as implemented using the preferred embodiment of the present invention are shown.

FIG. 5a shows a polling type of deterministic contention algorithm. In this example, four nodes (A, B, C, and D) are connected to four separate ports 38 on the hub controller 32 (FIG. 3). At step 102, the processor 54 is provided with the access requirements of each of the nodes 34. In this example, Node A requires three-fourths of the total network capacity of the CSMA/CD protocol LAN 30. The other nodes B, C and D have no deterministic access requirements and may be polled on a fair basis. At step 104, the processor polls node A by generating the pseudo carrier control signal (Carrier) to nodes B, C and D. If node A has a message to be transmitted it transmits this message (steps 106 and 108). At step 110, the processor polls one of the other nodes B, C, or D, by generating the pseudo carrier control signal (Carrier) to Node A and the two non-polled remaining other nodes, nodes C and D, for example. If the other node has a message to be transmitted it transmits this message (steps 112 and 114). At step 116, the selected one of the other nodes to be polled is incremented and the polling process is repeated at step 110.

It will be apparent that the total amount of time allocated to node A will be at least three-fourths of the total network capacity, and that if any of the user nodes B, C, or D do not have messages to transmit, the total time allocated to node A will be greater than three-fourths of the total network capacity. Conversely, if node A does not have a message to transmit at step 106, the actual amount of time allocated to node A may be less than three-fourths of the total network capacity, although node A will always be guaranteed to have the required network capacity allocated to it if node A has messages to transmit. In this way, the polling process of FIG. 5a replicates a quasi time-slot polling process whereby each polled node is given a predefined time slot in which to transmit messages (i.e., the maximum packet length as defined by the CSMA/CD protocol); however, if there is no message to be transmitted for that node then the time slot is not used and the controller polls the next node. In this way, this contention algorithm is more efficient than a traditional time division multiplexing scheme in that even though a node 34 requiring video transmission, for example, is polled at a fixed rate, if that node 34 is not active or does not have a transmission ready, no network capacity is wasted.

FIG. 5b shows an interrupt type of deterministic contention algorithm. As with the example shown in FIG. 5a, four nodes (A, B, C, and D) are contending for access to the LAN 32, with node A requiring in this case one-half of the total network capacity of the LAN 32 (FIG. 3). These access requirements are loaded into the microprocessor 54 (step 122). At step 124, the microprocessor drops Carrier to user A and generates the pseudo carrier control signal (Carrier) to all other users (B, C and D). During the time period required by user A, user A can transmit any messages it may have (steps 126, 128). Once the time period for transmissions from only user A has expired (step 130), then the microprocessor 54 drops the pseudo carrier control signal (Carrier) to all users (step 132). The pseudo carrier control signal (Carrier) remains dropped to all users until the remaining time has expired (step 134), after which control returns to step 124 to begin the exclusive time period for user A. It will be seen that during the remaining time period, all of the users, including user A, can compete for access to the bus 46 using the standard CSMA/CD protocol. In this way, user A can be guaranteed to have access for a given amount of the total network capacity. It will also be seen that more than two busses 82, 84 could be added, and that the microprocessor 74 could selectively control which ports 64 may be allowed to access which of the busses 82, 84.

Those skilled in the art will recognize that many variations of the deterministic contention algorithm of the preferred embodiment may be implemented, depending upon the manner in which the total network capacity is desired to be allocated among the various user nodes 34 connected to the ports 38 of the hub controller 32. For hub controllers 32 in which there are two or more ports requiring deterministic access, multiple polling patterns or interrupt time periods could be established to provide deterministic access to more than one port 38. In addition, these patterns in the deterministic contention algorithm of the present invention can be altered in response to a commands from a network administrator, for example, in response to a preestablished time schedule, or in response to control commands from the user nodes 34 that are monitored by the microprocessor 54, 74.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. A hub controller for use with a carrier-sense-multiple access (CSMA) protocol local area network (LAN) having a plurality of user nodes each of which inhibit transmission of messages from the user node when the user node senses a carrier signal in accordance with the CSMA protocol, the hub controller comprising:
   a plurality of ports, each port connected to a common bus internal to the hub controller and to a user node external to the hub controller that generates and receives messages in accordance with the CSMA protocol, each port including:
   media a control logic means for selectively controlling whether a pseudo carrier control signal which simulates the carrier signal in accordance with the CSMA protocol is presented to the user node connected to that port; and
   control means operably connected to each of the media control logic means for determining which of the ports will present the pseudo carrier control signal,
   such that the hub controller can selectively generate the pseudo carrier control signal to each port and thereby inhibit the transmission of any messages from the user node connected to that port.

2. The hub controller of claim 1 wherein the control means is a microprocessor that implements a preselected deterministic contention algorithm for controlling access to the common bus.

3. The hub controller of claim 2 wherein the deterministic contention algorithm is a sequential polling of each of the ports.

4. The hub controller of claim 3 wherein a user node does not occupy a time slot on the internal bus when polled if the user node has no messages to transmit.

5. The hub controller of claim 2 wherein the deterministic contention algorithm is an interrupt allocation whereby the control means selectively generates the pseudo carrier control signal to ports in response to receiving requests for access to the common bus.

6. The hub controller of claim 2 wherein the deterministic contention algorithm assigns a predetermined portion of a transfer bandwidth of the common bus to a selected one or more of the ports on a polling basis and the remaining ports contend for access to the remaining portion of the transfer bandwidth by sensing for the carrier signal in accordance with the CSMA protocol.

7. The hub controller of claim 1 further comprising:
   a router means operably connected to the common bus for transmitting and receiving the messages to other hub controllers.

8. The hub controller of claim 1 further comprising:
   one or more additional internal common busses operably connected to each port; and
   selection means as part of each port for selectively determining which of the common busses will be used to transmit each message.

9. The hub controller of claim 1 wherein the media control logic means comprises an OR gate connecting a carrier signal on the internal bus and the pseudo carrier control signal front the control means to a carrier signal line on the port that is connected to the user node.

10. The hub controller of claim 1 wherein the CSMA protocol is the American National Standards Institute (ANSI)/Institute for Electrical and Electronics Engineering (IEEE) 802.3 protocol.

11. A method for selectively controlling access to a hub controller that interconnects a plurality of user nodes operating on a carrier-sense-multiple-access (CSMA) protocol local area network (LAN) having a plurality of user nodes each of which inhibit transmission of messages from the user node when the user node senses a carrier signal in accordance with the CSMA protocol to a common internal bus within the hub controller, the hub controller including a computer processor, the method comprising the computer-implemented steps of:

selectively inhibiting transmission of any messages in accordance with the CSMA protocol from selected user nodes according to a preselected deterministic contention algorithm by selectively generating a pseudo carrier control signal that simulates the carrier signal to each of the selected user nodes to prevent those user nodes from initiating transmission of any messages in accordance with the CSMA protocol; and selectively allowing transmission of messages in accordance with the CSMA protocol from selected user nodes according to the preselected deterministic contention algorithm by selectively not generating the pseudo carrier control signal to each of the selected user nodes, such that the computer processor implements the deterministic contention algorithm without any modifications to the CSMA protocol as implemented within the user nodes.

12. The method of claim 11 wherein the deterministic contention algorithm is a sequential polling of each of the ports.

13. The method of claim 12 wherein a user nodes does not occupy a time slot on the internal bus when polled if the user node has no signals to transmit.

14. The method of claim 11 wherein the deterministic contention algorithm is an interrupt allocation whereby the computer processor of the hub controller selectively generates the pseudo carrier control signal to ports in response to receiving requests for access to the common bus.

15. The method of claim 11 wherein the deterministic contention algorithm assigns a predetermined portion of a transfer bandwidth of the common bits to a selected one or more of the ports on a polling basis and the remaining ports contend for access to the remaining portion of the transfer bandwidth by sensing for the carrier signal in accordance with the CSMA protocol 16. The method of claim 11 wherein the carrier signal is selectively raised by O-Ring a carrier signal on the internal bus with the pseudo carrier control signal from the computer processor to generate a carrier signal on the port that is connected to the user node.

17. The method of claim 11 wherein the CSMA protocol is the American National Standards Institute (ANSI)/Institute for Electrical and Electronics Engineering (IEEE) 802.3 protocol.

* * * * *

UNITED STATES PATENT AND TRADEMARK OFFICE
CERTIFICATE OF CORRECTION

PATENT NO. : 5,355,375
DATED : October 11, 1994
INVENTOR(S) : Gary S. Christensen It is certified that error appears in the above-indentified patent and that said Letters Patent is hereby corrected as shown below:

```
Claim 9, Col. 9, line 2, delete "front" and insert -- from --.
Claim 15, Col. 10, line 19, delete "bits" and insert -- bus --.
Claim 15, Col. 10, line 23, at the end of the sentence, insert --.--.
Claim 16, Col. 10, line 25, delete "O-Ring" and insert -- ORing --.
```

Signed and Sealed this

Third Day of January, 1995

Attest:

BRUCE LEHMAN

Attesting Officer

Commissioner of Patents and Trademarks